(12) United States Patent
Ikeda

(10) Patent No.: US 7,751,365 B2
(45) Date of Patent: Jul. 6, 2010

(54) WIRELESS ACCESS POINT APPARATUS, WIRELESS LAN SYSTEM, WIRELESS COMMUNICATING METHOD, PROGRAM FOR IMPLEMENTING THE METHOD, AND STORAGE MEDIUM STORING THE PROGRAM

(75) Inventor: Nobuhiro Ikeda, Yokohama (JP)

(73) Assignee: Canon Kabushiki Kaisha (JP)

( * ) Notice: Subject to any disclaimer, the term of this patent is extended or adjusted under 35 U.S.C. 154(b) by 444 days.

(21) Appl. No.: 11/063,021

(22) Filed: Feb. 22, 2005

(65) Prior Publication Data

US 2005/0185614 A1     Aug. 25, 2005

(30) Foreign Application Priority Data

Feb. 24, 2004     (JP) .............................. 2004-047799

(51) Int. Cl.
*H04W 4/00* (2009.01)
*H04W 72/00* (2009.01)

(52) U.S. Cl. ..................... 370/330; 455/450; 370/329; 370/338

(58) Field of Classification Search ............... 370/329, 370/330; 455/450–453
See application file for complete search history.

(56) References Cited

U.S. PATENT DOCUMENTS

| | | | |
|---|---|---|---|
| 6,374,112 B1 * | 4/2002 | Widegren et al. | 455/452.2 |
| 2001/0026546 A1 * | 10/2001 | Schieder et al. | 370/338 |
| 2003/0108059 A1 | 6/2003 | Yew et al. | |
| 2003/0125087 A1 * | 7/2003 | Shimizu | 455/561 |
| 2003/0218996 A1 * | 11/2003 | Sumino et al. | 370/328 |

FOREIGN PATENT DOCUMENTS

| | | |
|---|---|---|
| JP | 2000-253017 A | 9/2000 |
| JP | 2003-198564 A | 7/2003 |
| JP | 2003-209554 A | 7/2003 |

OTHER PUBLICATIONS

ANSI/IEEE Std 802.11, 1999 Edition (R2003), "Part 11: Wireless LAN Medium Access Control (MAC) and Physical Layer (PHY) Specifications", Jun. 12, 2003, pp. 1, 70-93.*
ANSI/IEEE Std 802.11, 1999 Edition (R2003), "Part 11: Wireless LAN Medium Access Control (MAC) and Physical Layer (PHY) Specifications", Jun. 12, 2003, pp. 34-36.*

* cited by examiner

*Primary Examiner*—Lester Kincaid
*Assistant Examiner*—Daniel Lai
(74) *Attorney, Agent, or Firm*—Rossi, Kimms & McDowell LLP

(57) ABSTRACT

A wireless access point apparatus which is capable of configuring an efficient transmission frame for a plurality of wireless communication terminals connected to or accommodated in the wireless access point apparatus, and therefore flexibly coping with the plurality of wireless communication terminals having various communicating functions. A data transmission area including a non-collision area capable of exclusively using a wireless medium and a collision area where random access communication is carried out is set in a data transmission frame. It is determined whether or not a specific wireless communicating apparatus has been connected to or accommodated in the wireless access point apparatus, and the data transmission area is changed according to the determination result. Information indicative of a new data transmission area is sent to wireless communication terminals connected to or accommodated in the wireless access point apparatus, including the specific wireless communicating apparatus.

11 Claims, 16 Drawing Sheets

006
WIRELESS ACCESS POINT APPARATUS, WIRELESS LAN SYSTEM, WIRELESS COMMUNICATING METHOD, PROGRAM FOR IMPLEMENTING THE METHOD, AND STORAGE MEDIUM STORING THE PROGRAM

BACKGROUND OF THE INVENTION

1. Field of the Invention

The present invention relates to a wireless access point apparatus which carries out wireless communications with a plurality of wireless communicating apparatuses located in a service area thereof, a wireless LAN system incorporating the wireless access point apparatus, a wireless communicating method, a program for implementing the method, and a storage medium storing the program.

2. Description of the Related Art

A wireless LAN system in general is comprised of wireless mobile terminals which carry out data communications with each other via a wireless transmission channel or a wired LAN, and an access point which carries out wireless communications with a plurality of wireless mobile terminals in a service area of the system and executes a bridging function of connecting a wireless area and a wired LAN to each other.

IEEE 802.11 as a wireless LAN standard defines a wireless access protocol between a wireless access station and a terminal station. In this standard, a DCF (Distributed Coordination Function) as a collision-type random access function based on CSMA/CA (Carrier Sense Multiple Access with Collision Avoidance) and a PCF (Point Coordination Function) as an optional function are defined. The PCF is a function of periodically setting a CFP (Contention Free Period) on a wireless channel used for communications with the terminal station by the wireless access station and carrying out non-collision type access during the CFP by polling (refer to Japanese Laid-Open Patent Publication (Kokai) No. 2000-253017, for example).

Referring next to FIG. 18, a description will be given of a wireless transmission frame in a wireless LAN system using the conventional PCF and DCF. FIG. 18A is a diagram showing an example of the structure of a wireless transmission frame in a wireless LAN system using the conventional PCF and DCF, and FIG. 18B is a diagram showing an example of the structure of a wireless transmission frame in the case where only the DCF is used.

In the wireless transmission frame in the wireless LAN system using the conventional PCF and DCF, as shown in FIG. 18A, a transmission frame which comes every predetermined transmission frame period 205 is defined, and a beacon information transmission area 201 and a data transmission area 204 are provided in the transmission frame. Here, the frame structure is shown in a convenient form, but this structure form should not necessarily be used.

The beacon information transmission area 201 is used to notify a frame period and network common information, and is located at the top of the frame. The beacon information is a management area (frame synchronization area) including frame synchronization information, and is assigned to each communicating station constituting a network. For the beacon information, an arrangement has been devised which prevents collision of data sent from a plurality of communicating stations.

The beacon information includes information about an area for which bandwidth reservation has been made in the data transmission area 204, and an asynchronous transmission area. Specifically, the data transmission area 204 is comprised of a bandwidth-reserved transmission area (PCF) 202 set as the need arises, and an asynchronous transmission area (DCF) 203 outside the bandwidth-reserved transmission area (PCF) 202. The bandwidth-reserved transmission area (PCF) 202 is also referred to as a non-collision area, which can be exclusively used by an arbitrary wireless terminal by polling from a wireless access point apparatus. The asynchronous transmission area (DCF) 203 is also referred to as a collision area, which is a time area during which communication is carried out at random according to a predetermined procedure.

The bandwidth-reserved transmission area (PCF) 202 is provided as an optional function; in the case where the amount of data in a wireless terminal is assumed to be small, or in the case where communication is irregular, the transmission efficiency is deteriorated by polling a plurality of wireless terminals, and hence in an ordinary wireless access point apparatus, a normal wireless transmission frame comprised of the beacon information transmission area 201 and the asynchronous transmission area (DCF) 203 as shown in FIG. 18B is used.

As mentioned above, the asynchronous transmission area (DCF) 203 is used for transmission of data to and from the wireless access point apparatus and a plurality of wireless terminals connected to or accommodated in the wireless access point apparatus. However, as to wireless terminals connected to or accommodated in the service area, the larger the number of wireless terminals connected to one access point, the higher the probability of collision, and hence the number of times a wireless medium message channel medium is assigned to one wireless terminal per unit time is decreased to deteriorate the throughput in sending and receiving data. When activated, the wireless access point apparatus sends a beacon according to a wireless transmission frame structure fixed in advance and dedicated to the apparatus.

However, when activated, the conventional wireless access point apparatus sends a beacon according to a wireless transmission frame structure fixed in advance and dedicated to the apparatus, and hence in the case where a wireless terminal which desires regular transmissions and has a wireless function of sending and receiving data in real-time, such as a digital video apparatus, is connected to or accommodated in the wireless access point apparatus which permits only the asynchronous transmission area (DCF), the above wireless terminal has to carry out random access communications with the other wireless terminals according to a predetermined procedure while conflicting with them during the asynchronous transmission area (DCF), and as a result, data cannot be surely transmitted in real-time.

Also, in the case where not a wireless terminal which desires regular transmissions and has a wireless function of sending and receiving data in real-time, such as a digital video apparatus, but wireless terminals which do not place emphasis on real-time transmissions are connected to or accommodated in an access point apparatus which permits both the bandwidth-reserved transmission area (PCF) and the asynchronous transmission area (DCF), the bandwidth-reserved transmission area (PCF) which is not used is incorporated into the wireless transmission frame structure, and hence the period of time which is assigned to the asynchronous transmission area (DCF) is decreased. As a result, when access from wireless terminals occurs concentratedly, the throughput is deteriorated.

SUMMARY OF THE INVENTION

It is an object of the present invention to provide a wireless access point apparatus, a wireless LAN system incorporating the wireless access point apparatus, and a wireless communicating method, which are capable of configuring an efficient transmission frame for a plurality of wireless communication terminals connected to or accommodated in the wireless access point apparatus, and therefore flexibly coping with the plurality of wireless communication terminals having various communications functions, and a program for implementing the method, and a storage medium storing the program.

To attain the above object, in a first aspect of the present invention, there is provided a wireless access point apparatus comprising a setting device that sets a data transmission area including a non-collision area capable of exclusively using a wireless medium, and a collision area where random access communication is carried out, a detecting device that detects whether a specific wireless communicating apparatus has been connected to or accommodated in the wireless access point apparatus, a changing device that changes the data transmission area according to a result of the detection by the detecting device, and a sending device that sends information indicative of a new data transmission area obtained by the changing device to the at least one wireless communicating apparatus.

Preferably, the sending device sends information indicating that the data transmission area comprising the non-collision area and the collision area is to be used as a data transmission frame, by broadcast to a plurality of wireless communicating apparatuses existing in a service area of the wireless access point apparatus.

Also preferably, the sending device sends information indicating that the data transmission area comprising the non-collision area and the collision area is to be used as a data transmission frame, by broadcast using beacon information.

Alternatively, the sending device sends information indicating that the data transmission area comprising the non-collision area and the collision area is to be used as a data transmission frame, by unicast to a plurality of wireless communicating apparatuses existing in a service area of the wireless access point apparatus.

Preferably, after or while the specific wireless communicating apparatus is connected to or accommodated into the wireless access point apparatus, the specific wireless communicating apparatus sends a message including information relating to the non-collision area, and the changing device changes the data transmission area according to the message.

Preferably, the changing device changes the data transmission area in response to a request from the specific wireless communicating apparatus.

More preferably, the request from the specific wireless communicating apparatus includes information relating to the non-collision area.

Preferably, the new data transmission area obtained by the changing device comprises the non-collision area and the collision area.

More preferably, the collision area is reduced to be assigned to the non-collision area.

Preferably, the wireless access point apparatus comprises a determining device that determines a communication state of the at least one wireless communicating apparatus connected to or accommodated in the wireless access point apparatus, and the changing device changes the data transmission area when the determining device detects that there is no wireless communicating apparatus being in communication.

Preferably, the sending device suspends transmission of information indicative of currently used data transmission area for a predetermined period of time before the sending device sends the information indicative of the new data transmission area.

Preferably, the sending device disconnects link with the at least one wireless communicating apparatus connected to or accommodated in the wireless access point apparatus before the sending device sends the information indicative of the new data transmission area.

Preferably, the changing device changes the data transmission area when it is determined that any of the at least one wireless communicating apparatus using the non-collision area has been detached from the wireless access point apparatus.

Preferably, the new transmission area obtained by the changing device comprises the collision area.

Preferably, the detecting device detects whether a wireless communicating apparatus carrying out communication of data in real-time as the specific wireless communication apparatus has been connected to or accommodated in the wireless access point apparatus.

To attain the above object, in a second aspect of the present invention, there is provided a wireless LAN system comprising a wireless access point apparatus being capable of setting a data transmission area including a non-collision area capable of exclusively using a wireless medium, and a collision area where random access communication is carried out, wherein the wireless access point apparatus comprises a detecting device that detects whether a specific wireless communicating apparatus has been connected to or accommodated in the wireless access point apparatus, a changing device that changes the data transmission area according to a result of the detection by the detecting device, and a sending device that sends information indicative of a new data transmission area obtained by the changing device to the at least one wireless communicating apparatus.

To attain the above object, in a third aspect of the present invention, there is provided a wireless communicating method comprising a setting step of setting a data transmission area including a non-collision area capable of exclusively using a wireless medium, and a collision area where random access communication is carried out, a detecting step of detecting whether a specific wireless communicating apparatus has been connected to or accommodated in a wireless access point apparatus, a changing step of changing the data transmission area according to a result of the detection in the detecting step, and a sending step of sending information indicative of a new data transmission area obtained in the changing step to at least one wireless communicating apparatus.

To attain the above object, in a fourth aspect of the present invention, there is provided a computer-readable program for implementing a wireless communicating method, comprising a setting module for setting a data transmission area including a non-collision area capable of exclusively using a wireless medium, and a collision area where random access communication is carried out, a detecting module for detecting whether a specific wireless communicating apparatus has been connected to or accommodated in a wireless access point apparatus, a changing module for changing the data transmission area according to a result of the detection by the detecting module, and a sending module for sending information indicative of a new data transmission area obtained by the changing module to at least one wireless communicating apparatus.

To attain the above object, in a fifth aspect of the present invention, there is provided a storage medium storing a computer-readable program for implementing a wireless communicating method, the program comprising a setting module for setting a data transmission area including a non-collision area capable of exclusively using a wireless medium, and a collision area where random access communication is carried out, a detecting module for detecting whether a specific wireless communicating apparatus has been connected to or accommodated in a wireless access point apparatus, a changing module for changing the data transmission area according to a result of the detection by the detecting module, and a sending module for sending information indicative of a new data transmission area obtained by the changing module to at least one wireless communicating apparatus.

According to the present invention, an efficient transmission frame can be configured for a plurality of wireless communication terminals connected to or accommodated in a wireless access point apparatus, and therefore it is possible to flexibly cope with the plurality of wireless communication terminals having various communications functions.

Moreover, according to the present invention, in the case where a wireless communication terminal which carries out real-time data transmission is connected to or accommodated in a wireless access point apparatus which permits the use of only an asynchronous transmission area (DCF), data transmission area information which permits the use of both a bandwidth-reserved transmission area (PCF) and the asynchronous transmission area (DCF) can be used as a transmission frame period, and therefore, conflict between the specific wireless communication terminal and other plurality of wireless communication terminals can be avoided.

The above and other objects, features, and advantages of the invention will become more apparent from the following detailed description taken in conjunction with the accompanying drawings.

BRIEF DESCRIPTION OF THE DRAWINGS

FIGS. 18A and 18B are diagrams showing a conventional wireless transmission frame data format, in which FIG. 18A shows one example and FIG. 18B shows another example.

DETAILED DESCRIPTION OF THE PREFERRED EMBODIMENTS

The present invention will now be described in detail with reference to the drawings showing preferred embodiments thereof.

Figure 1:
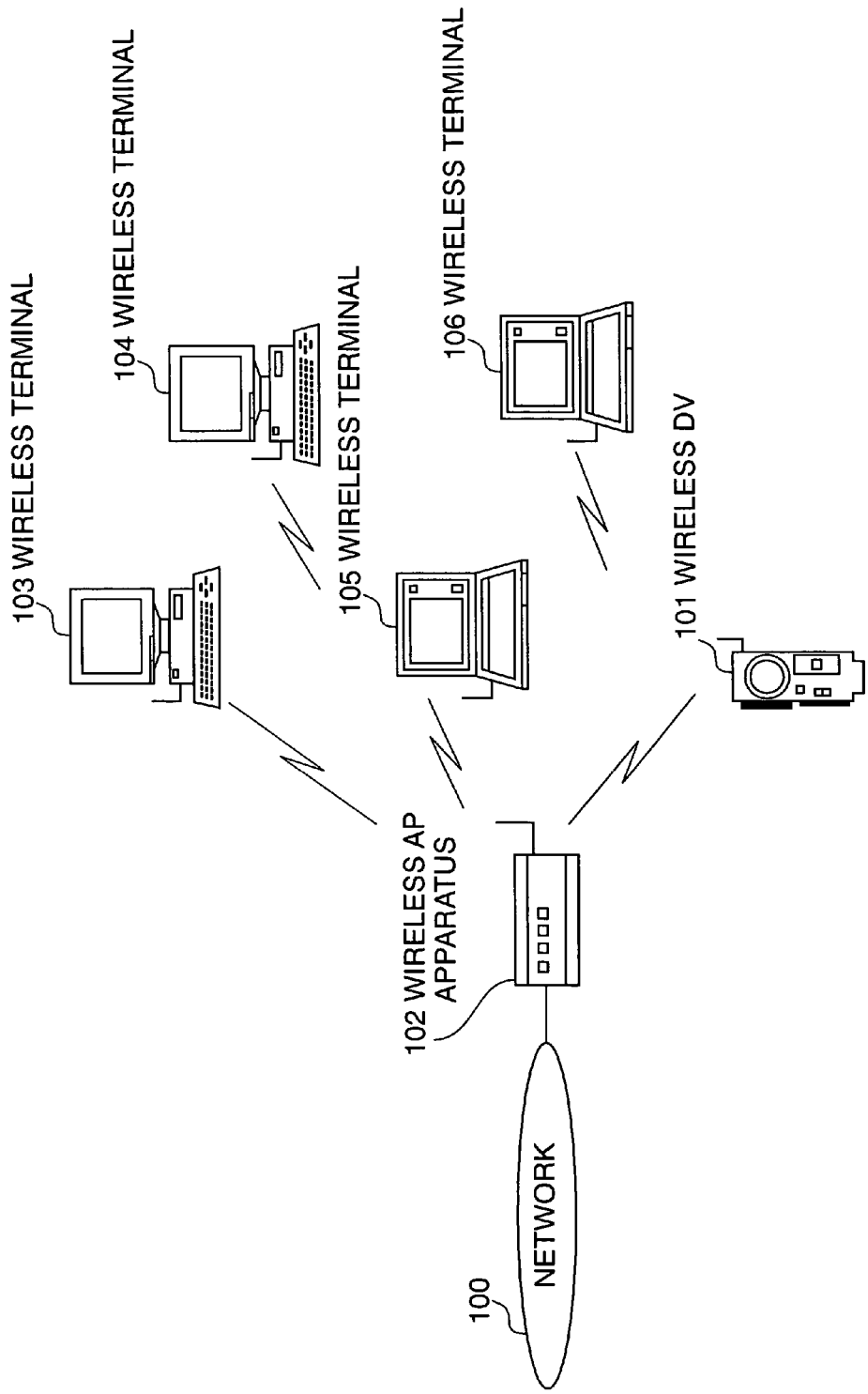
FIG. 1 is a diagram schematically showing the arrangement of a wireless LAN system according to a first embodiment of the present invention.

FIG. 1 is a diagram schematically showing the arrangement of a wireless LAN system according to a first embodiment of the present invention.

As shown in FIG. 1, the wireless LAN (Local Area Network) system includes a wireless access point apparatus (wireless AP apparatus) 102, which establishes a wireless communication link between a wireless digital video camera (wireless DV) 101 and desktop type or notebook PC type wireless terminals 103 to 106. The wireless access point apparatus 102 is wired-connected to a network 100 via a wired interface, for providing a data carrier controlling/route selecting function in the network 100.

Figure 2:
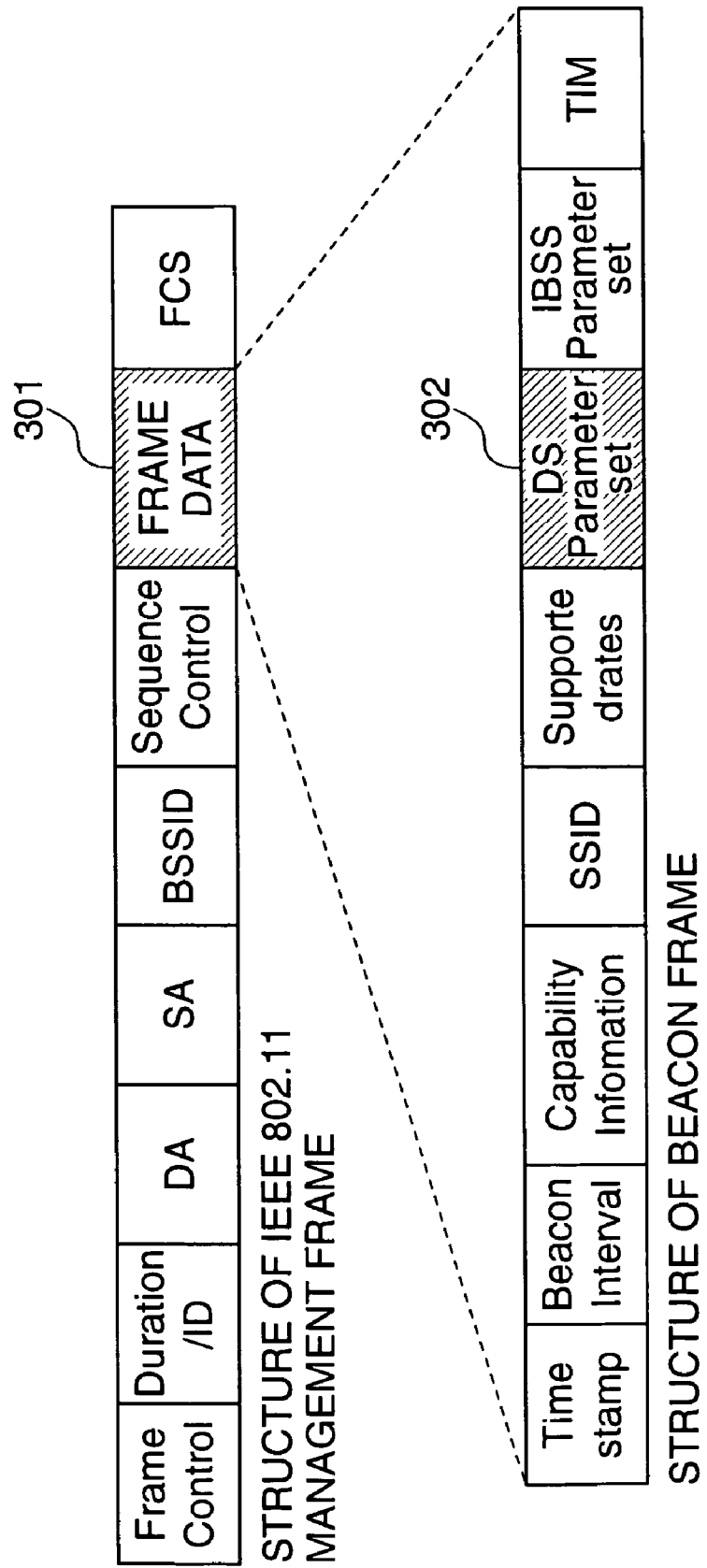
FIG. 2 is a diagram showing the structure of an IEEE 802.11 management frame including a beacon frame used in the wireless LAN system in FIG. 1.
Figure 3:
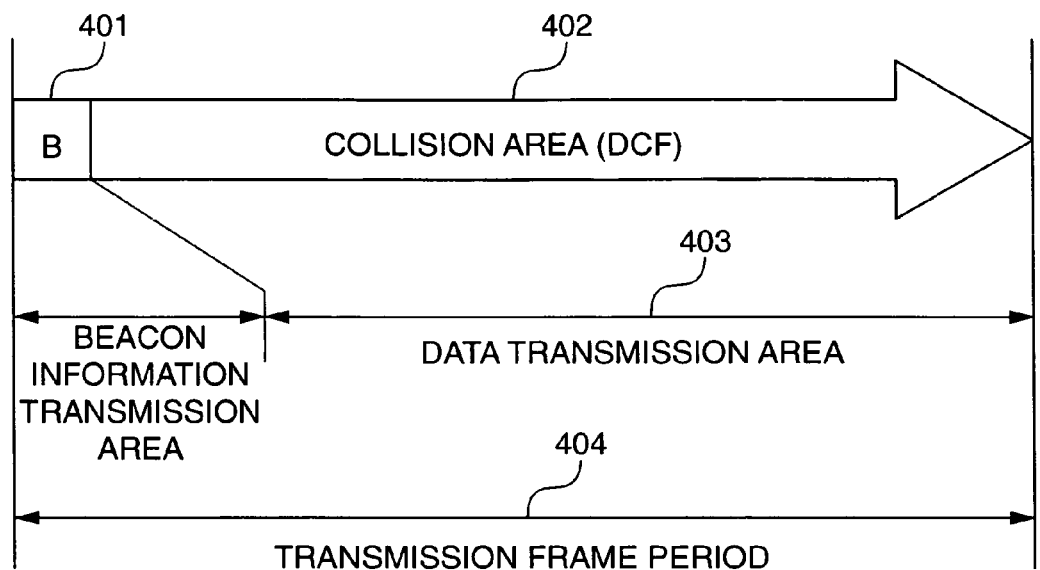
FIG. 3 is a diagram showing a wireless transmission frame data format used in the wireless LAN system in FIG. 1.
Figure 4:
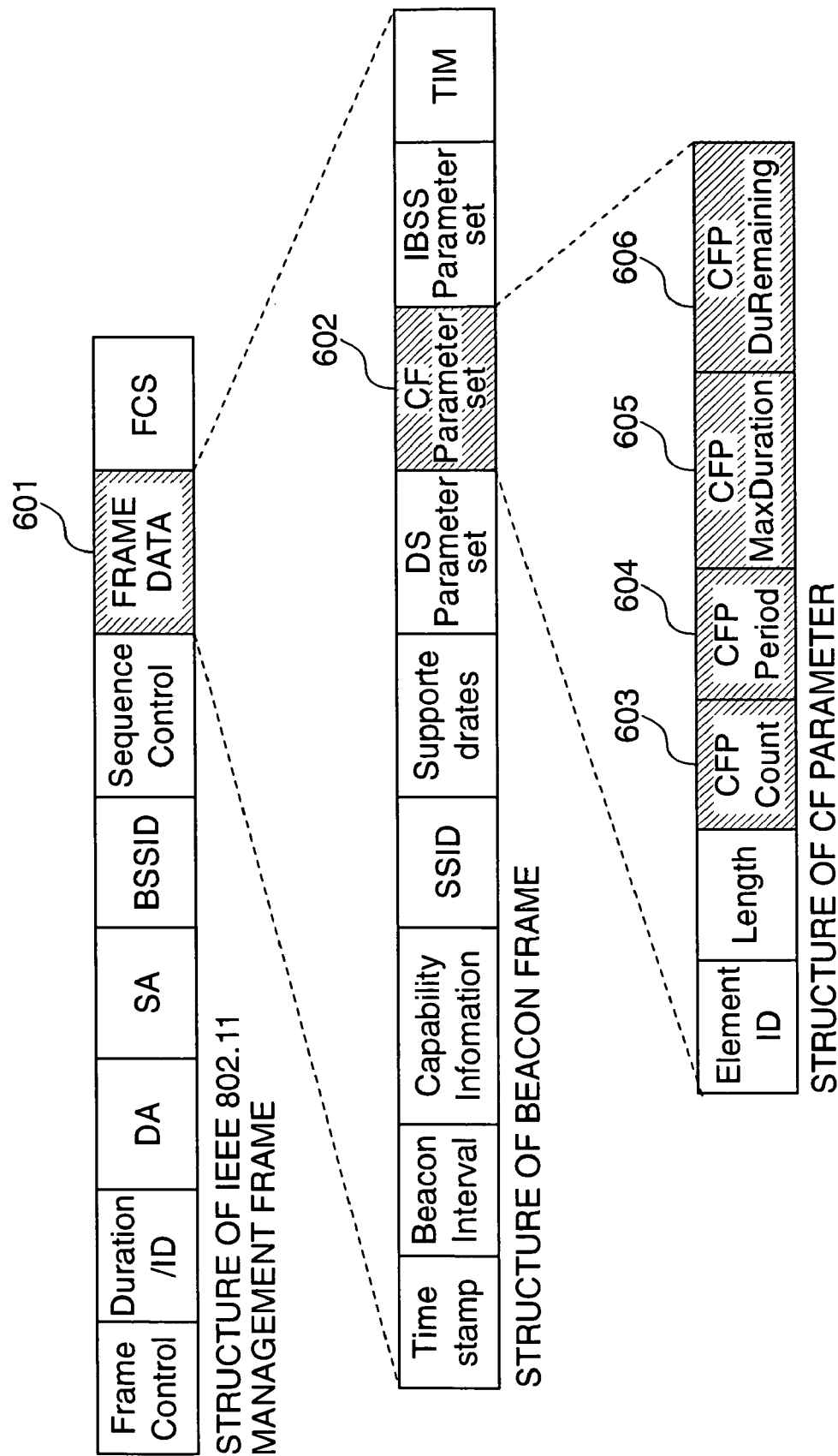
FIG. 4 is a diagram showing another example of the structure of the IEEE 802.11 management frame including a beacon frame structure used in the wireless LAN system in FIG. 1.
Figure 5:
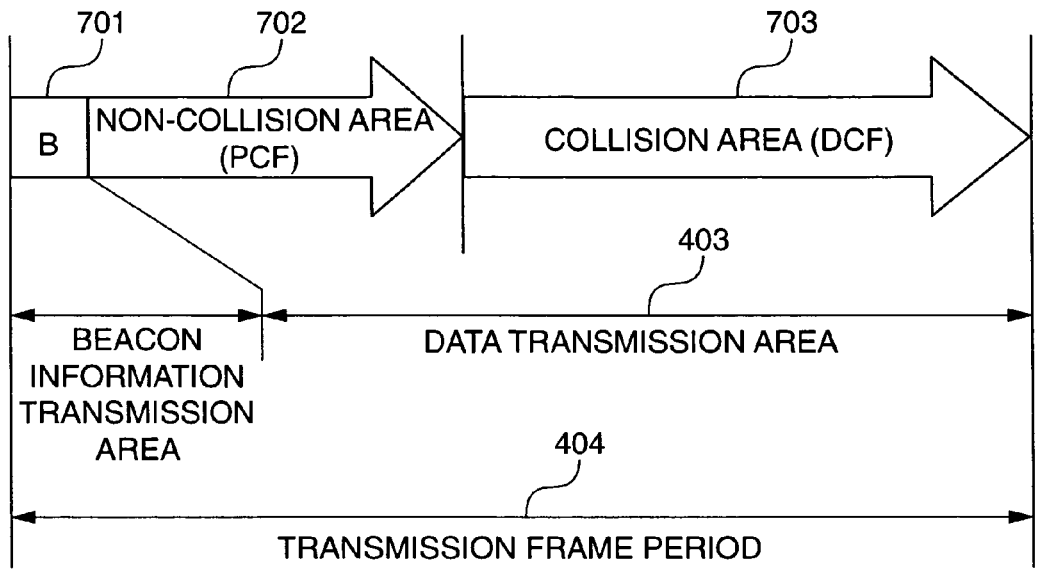
FIG. 5 is a diagram showing another example of the wireless transmission frame data format used in the wireless LAN system in FIG. 1.
Figure 6A:
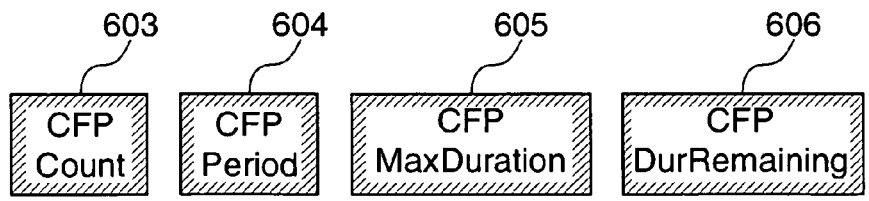
FIGS. 6A and 6B are diagrams showing examples of settings of main information elements of transmission data relating to a PCF appearing in FIG. 5.
Figure 6B:
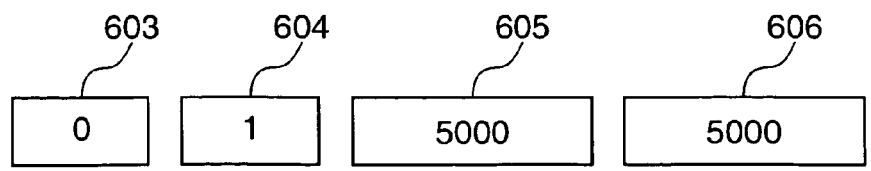
Figure 7:
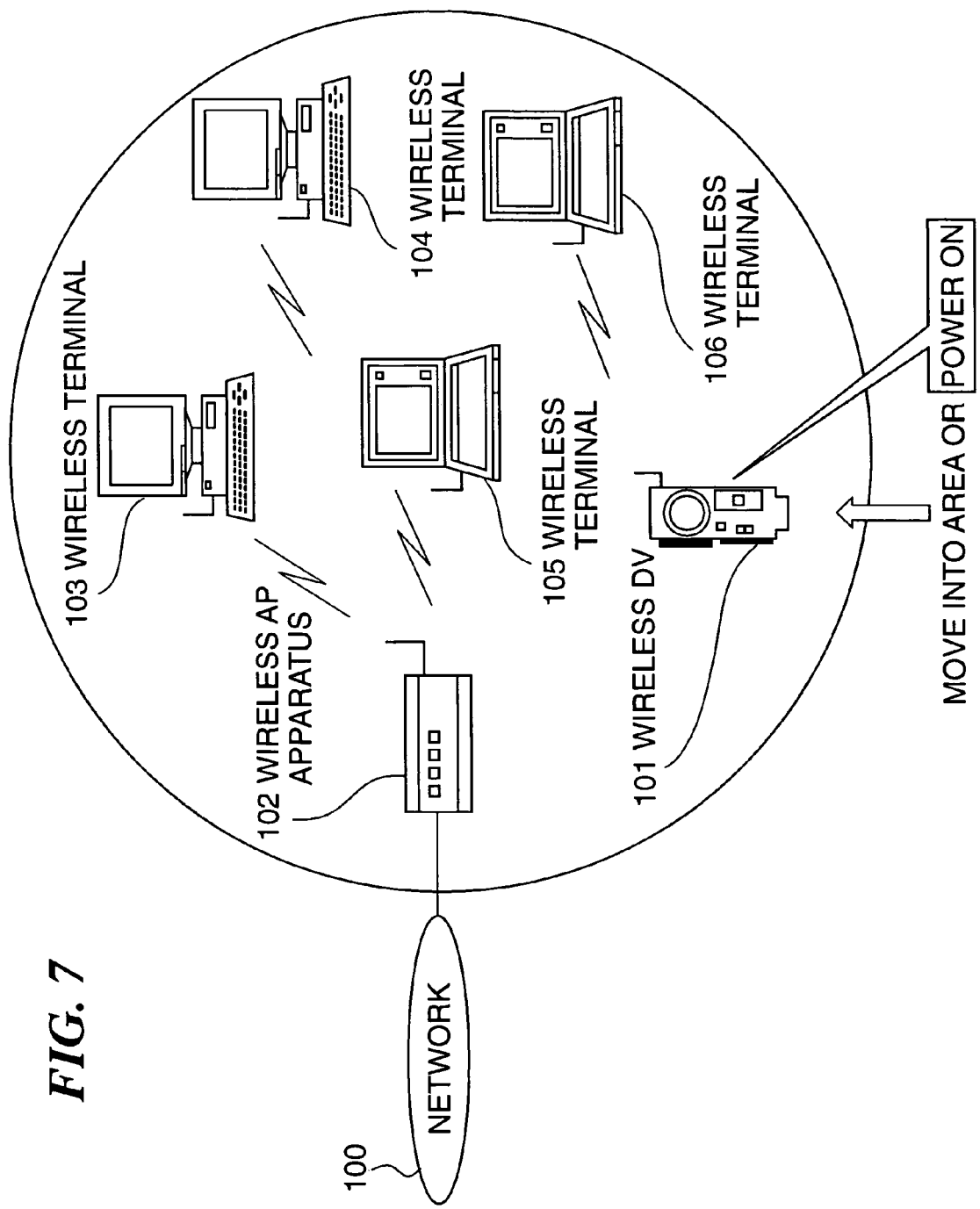
FIG. 7 is a diagram schematically showing a state in which a wireless access point apparatus in the wireless LAN system in FIG. 1 transmits a beacon frame shown in FIG. 2 by broadcast during a transmission frame period shown in FIG. 3.
Figure 8:
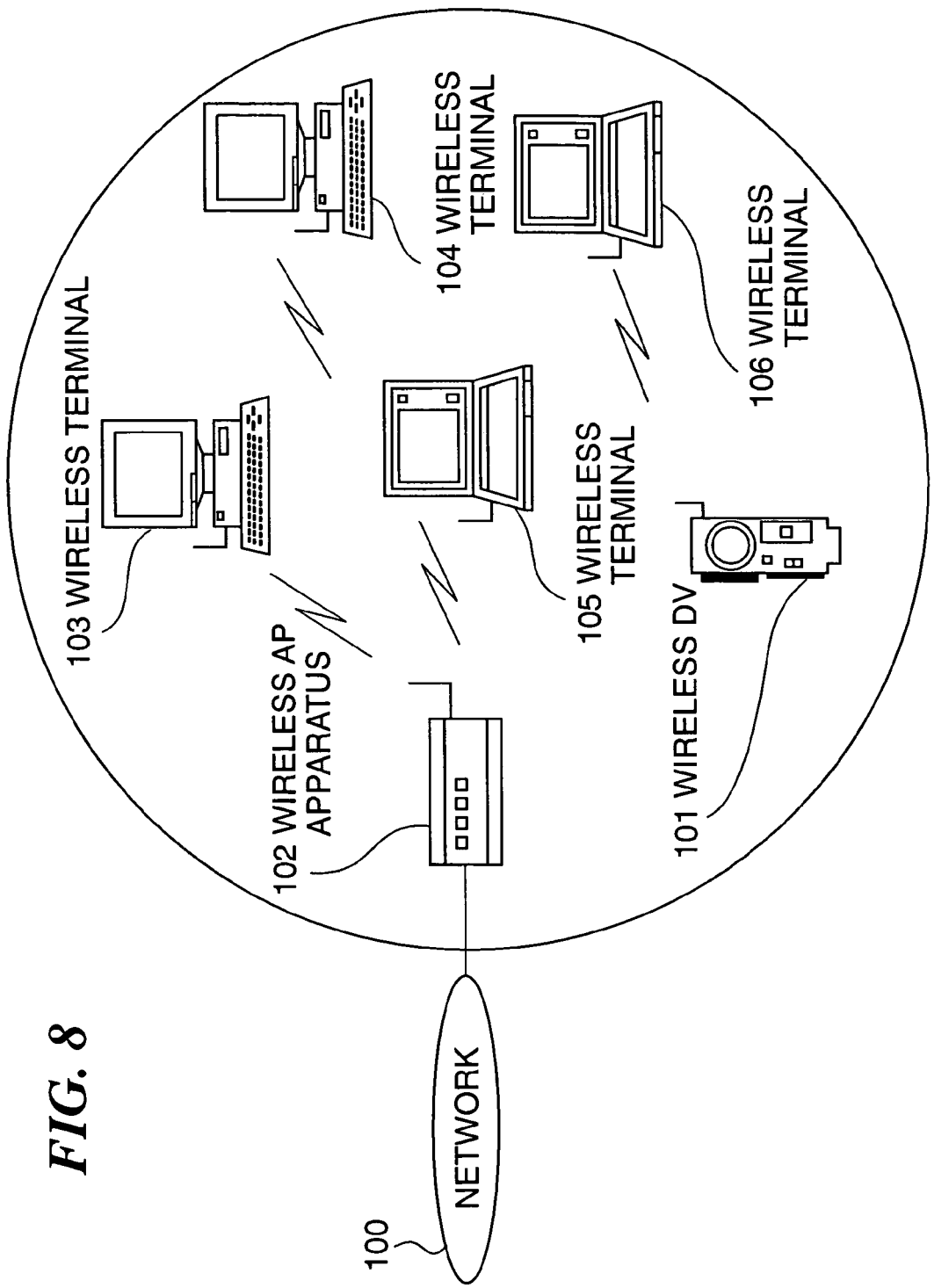
FIG. 8 is a diagram schematically showing a state in which a wireless access point apparatus in the wireless LAN system in FIG. 1 transmits a beacon frame shown in FIG. 4 by broadcast during a transmission frame period shown in FIG. 5.

Referring next to FIGS. 2 to 8, a description will be given of the structure of an IEEE 802.11 management frame including a beacon frame structure and a wireless transmission frame, used in the wireless LAN system according to the present embodiment. FIG. 2 is a diagram showing the structure of an IEEE 802.11 management frame including a beacon frame used in the wireless LAN system in FIG. 1. FIG. 3 is a diagram showing a wireless transmission frame data format used in the wireless LAN system in FIG. 1. FIG. 4 is a diagram showing another example of the structure of the IEEE 802.11 management frame including a beacon frame structure used in the wireless LAN system in FIG. 1. FIG. 5 is a diagram showing another example of the wireless transmission frame data format used in the wireless LAN system in FIG. 1. FIGS. 6A and 6B are diagrams showing examples of settings of main information elements of transmission data relating to a PCF appearing in FIG. 5. FIG. 7 is a diagram schematically showing a state in which the wireless access point apparatus in the wireless LAN system in FIG. 1 transmits a beacon frame shown in FIG. 2 by broadcast during a transmission frame period shown in FIG. 3. FIG. 8 is a diagram schematically showing a state in which the wireless access point apparatus in the wireless LAN system in FIG. 1 transmits a beacon frame shown in FIG. 4 by broadcast during a transmission frame period shown in FIG. 5.

In the present embodiment, in the case where random communications are carried out between the wireless access point apparatus 102 and the wireless terminals 103 to 106, a management frame defined by IEEE 802.11 as shown in FIG. 2 is used, which includes frame data 301 indicative of a beacon frame. Here, a DS parameter set 302 in the frame data 301 is an area where information relating to a collision area (DCF) is set. The beacon frame is transmitted by broadcast into the service area during a transmission frame period 404 appearing in FIG. 3. The transmission frame period 404 in FIG. 3 includes a beacon information transmission area 401 and a data transmission area 403. In the illustrated example, no non-collision area (PCF) as an option exists in the data transmission area 403, and entire data transmission area 403 is used as a collision area (DCF) 402.

In the present embodiment, for example, in a case as shown in FIG. 7, where the wireless digital video camera 101, which has a wireless function of sending and receiving data in real-time, is not connected to or accommodated in the wireless access point apparatus 102, the wireless access point 102 and the plurality of wireless terminals 103 to 106 carry out random access communications according to a predetermined procedure while conflicting with each other. In this case, a beacon frame is sent from the wireless access point apparatus 102 into the service area by broadcast during the transmission frame period 404 in FIG. 3.

If a contention service is required, a point coordination function (PCF) is used. In this case, a management frame defined by IEEE 802.11 as shown in FIG. 4 is used, which includes frame data 601 indicative of a beacon frame. A CF parameter set 602 as an area where information relating to a non-collision area (PCF) is set is provided in the frame data 601, and includes a CFP Count 603, a CFP Period 604, a CFP Max Duration 605, and a CFP Dur Remaining 606. The CFP Count 603 is indicative of how many DTIM (parameter used for notifying broadcast data) elements are included in a beacon to be sent before the next non-collision area (PCF) is started. If the CFP Count 603 is indicative of 0, this means that the present DTIM starts a CFP. The CFP Period 604 is indicative of the number of times DTIM is repeated between non-collision areas (PCF). The CFP Max Duration 605 is indicative of the maximum transmission period (μs) in a non-collision area (PCF). The CFP Dur Remaining 606 is indicative of the maximum usable period (μs) remaining in the present non-collision area (PCF). For example, values as shown in FIG. 6 are set for the respective parameters of the CFP Count 603, the CFP Period 604, the CFP Max Duration 605, and the CFP Dur Remaining 606.

The above-mentioned beacon frame is sent into the service area by broadcast during the transmission frame period 404 in FIG. 5. The transmission frame period 404 in FIG. 5 includes a beacon information transmission area 701 and a data transmission area 403 which is comprised of a non-collision area (PCF) 702 and a collision area (DCF) 703.

In the present embodiment, for example, in a case as shown in FIG. 8, where the wireless digital video camera 101 having a wireless function requiring real-time performance is connected to or accommodated in the wireless access point apparatus 102, the beacon frame in FIG. 4 is sent into the service area by broadcast during the transmission frame period 404 in FIG. 5.

Figure 9:
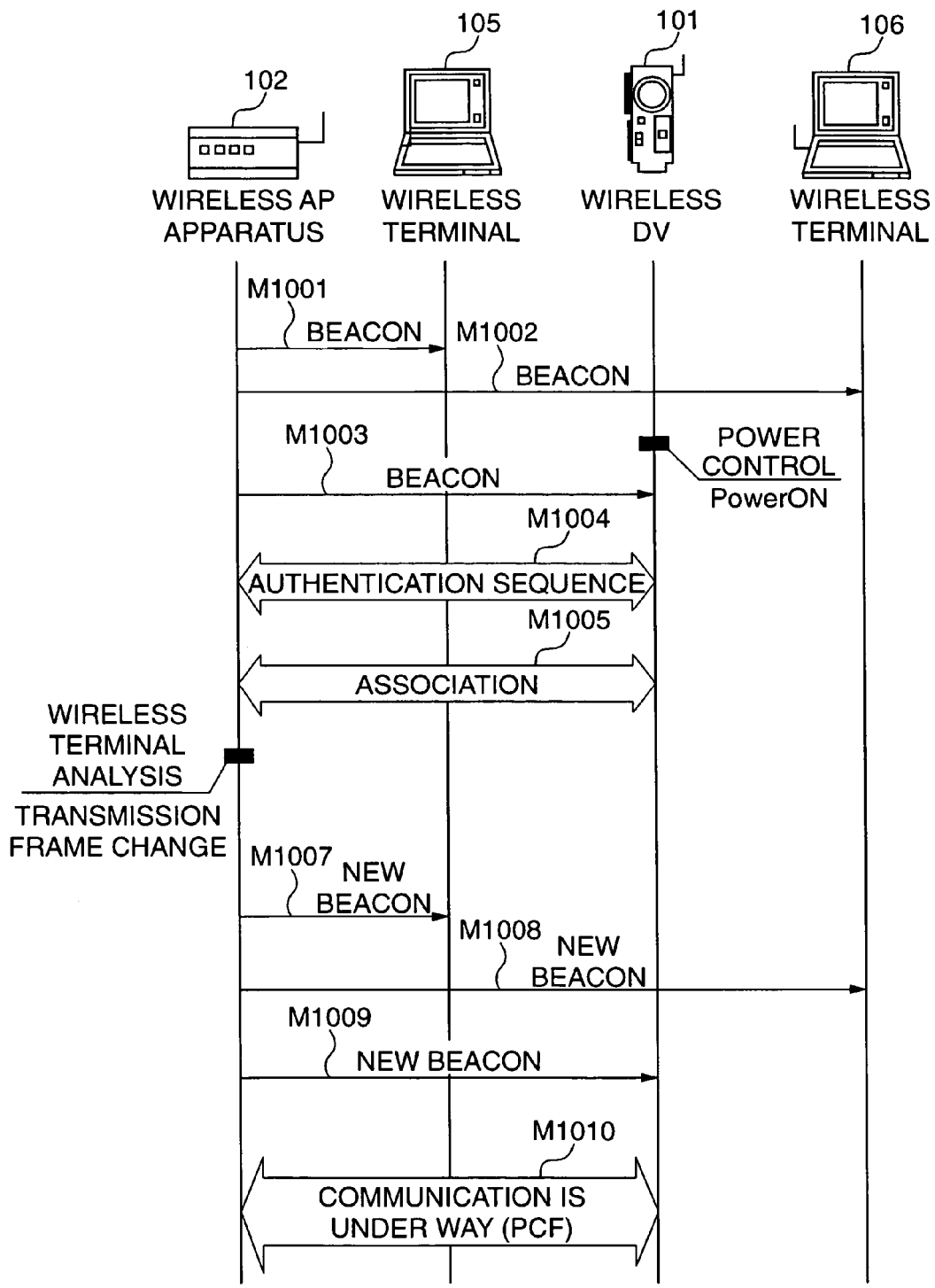
FIG. 9 is a diagram showing a communicating process sequence carried out between the wireless access point apparatus in the wireless LAN system in FIG. 1 and a wireless digital video camera (wireless DV) and a wireless terminal.
Figure 10:
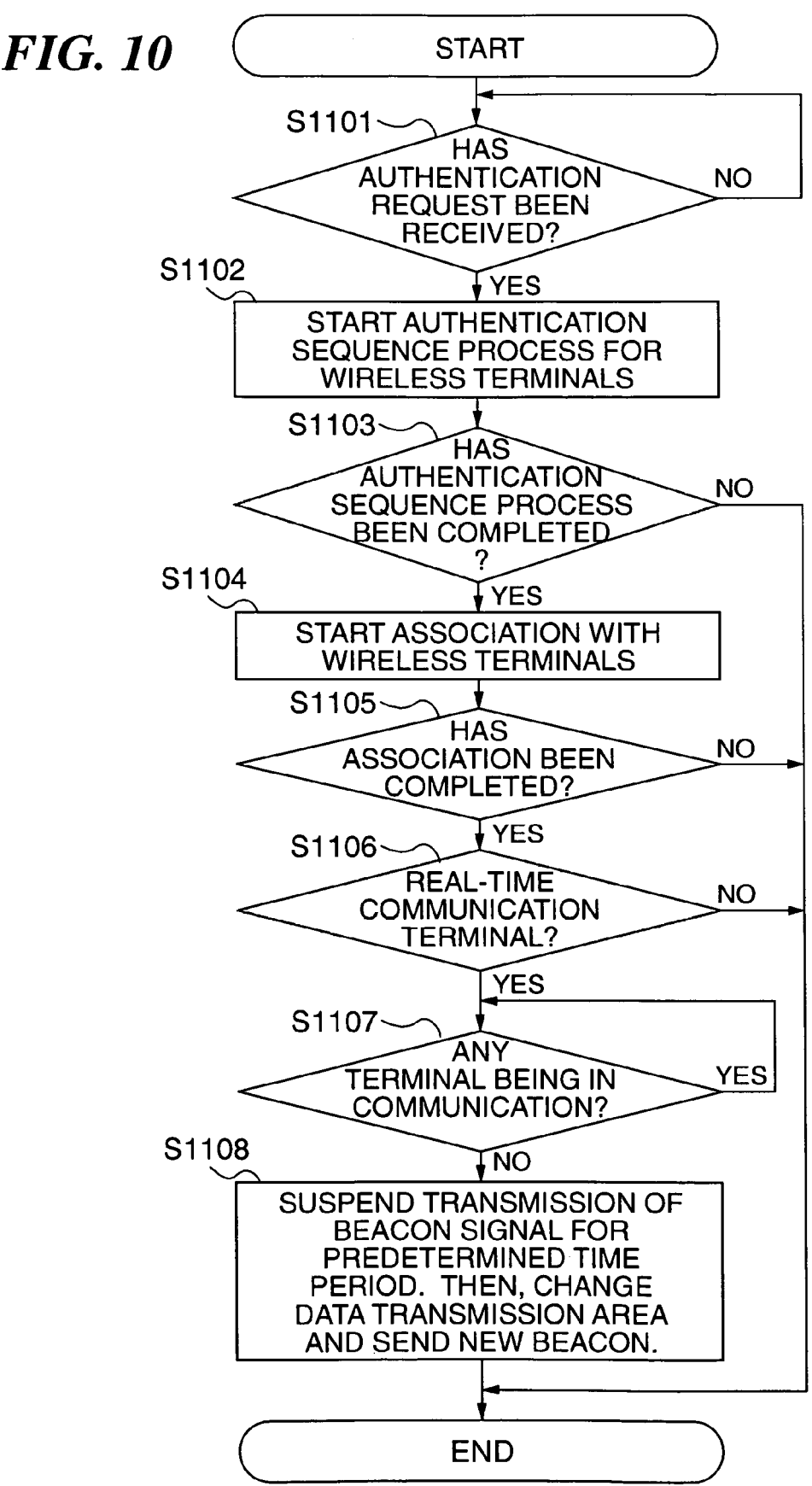
FIG. 10 is a flow chart showing the procedure of a communicating process carried out when the wireless access point apparatus in the wireless LAN system in FIG. 1 is activated.
Figure 11:
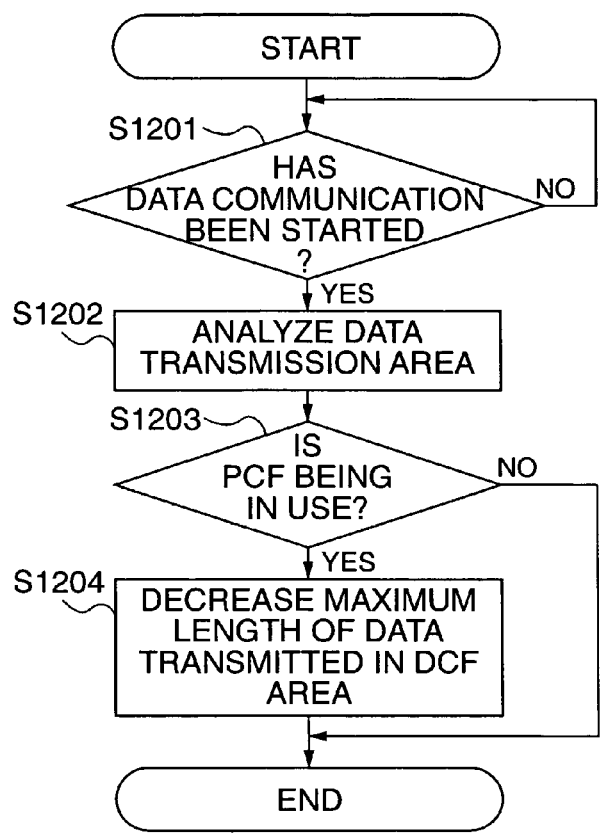
FIG. 11 is a flow chart showing the procedure of a communicating process carried out when the wireless access point apparatus in the wireless LAN system in FIG. 1 transmits data.
Figure 12:
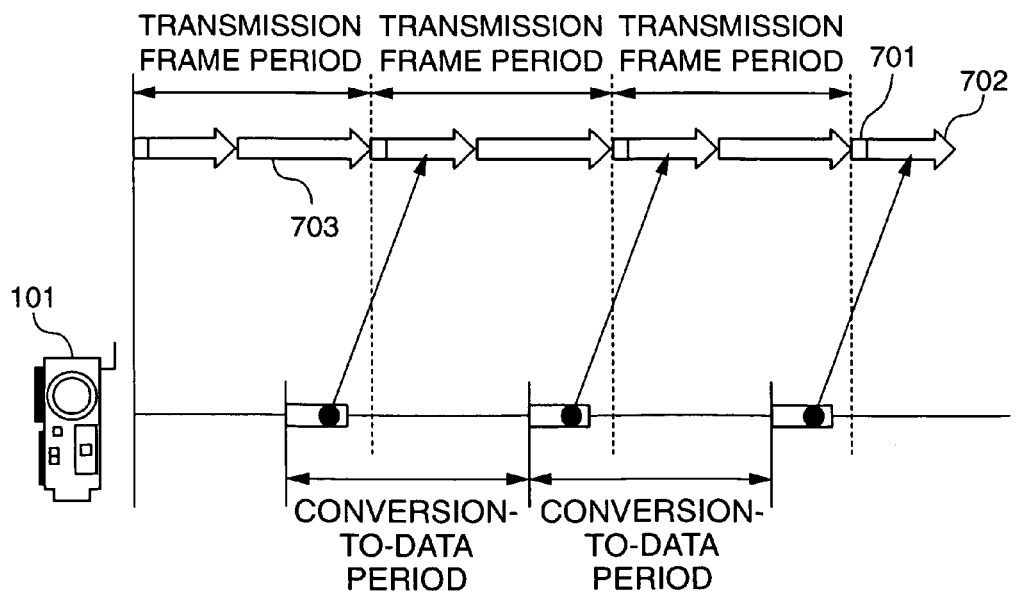
FIG. 12 is a diagram showing timing in which the wireless digital video camera in the wireless LAN system in FIG. 1 transmits data.

Referring next to FIGS. 9 to 12, a description will be given of wireless communications according to the present embodiment. FIG. 9 is a diagram showing a communicating process sequence carried out between the wireless access point apparatus in the wireless LAN system in FIG. 1 and the wireless digital video camera (wireless DV) and a wireless terminal. FIG. 10 is a flow chart showing the procedure of a communicating process carried out when the wireless access point apparatus in the wireless LAN system in FIG. 1 is activated. FIG. 11 is a flow chart showing the procedure of a communicating process carried out when the wireless access point apparatus in the wireless LAN system in FIG. 1 transmits data. FIG. 12 is a diagram showing timing in which the wireless digital video camera in the wireless LAN system in FIG. 1 transmits data. For the convenience of explanation, only the wireless terminals 105 and 106 among the wireless terminals 103 to 106 are shown in FIG. 9.

When activated, the wireless access point apparatus 102 sets information relating to the collision area (DCF) 402 in an area for setting the DS Parameter Set 302 constituting a part of the beacon frame data 301 in the management frame data format defined by IEEE 802.11, to thereby configure the management frame data. Then, as shown in FIG. 9, the wireless access point apparatus 102 sends a beacon to the wireless terminals 103 to 106 in the service area by broadcast during the transmission frame period (see FIG. 3) comprised of the beacon information transmission area 401 and the data transmission area 403 (M1001 and M1002).

Then, when the wireless digital video camera 101 outside the service area of the wireless access point apparatus 102 is moved into the service area, or in the case where the wireless digital video camera 101 is activated in the service area by e.g. turning-on of power supply (see FIG. 7), the wireless digital video camera 101 receives the beacon sent by broadcast from the wireless access point apparatus 102 (M1003). Then, the wireless digital video camera 101 carries out an authentication sequence process between itself and the wireless access point apparatus 102 according to access point identifier (ES-SID) information so as to request connection to or accommodation into the wireless access point apparatus 102 (M1004).

Upon completion of the authentication sequence process (M1004) between the wireless access point apparatus 102 and the wireless digital video camera 101, the wireless digital video camera 101 carries out association with the wireless access point apparatus 102 (M1005).

When ascertaining that the association (M1005) has been completed, the wireless access point apparatus 102 then determines whether or not the wireless digital video camera 101 connected to or accommodated in the wireless access point apparatus 102 is a wireless terminal capable of carrying out real-time communications essentially requiring a non-collision area (PCF). When it is determined that the wireless digital video camera 101 connected to or accommodated in the wireless access point apparatus 102 is a wireless terminal capable of carrying out real-time communications essentially requiring a non-collision area (PCF), if there is any wireless terminal being in communication among the wireless terminals 103 to 106 connected to or accommodated in the wireless access point apparatus 102, the wireless access point apparatus 102 waits until the wireless terminal completes communication. Then, when the wireless terminal having been in communication completes communication, or there is no wireless terminal being in communication among the wireless terminals 103 to 106 connected to or accommodated in the wireless access point apparatus 102, the wireless access point apparatus 102 suspends the transmission of the beacon for a predetermined period of time (for example, 10 seconds) and sets values to respective parameters relating to the non-collision area (PCF) 702 in the setting area of the CF Parameter Set 602 constituting a part of the beacon frame data 601 in a management frame data format defined by IEEE 802.11, thus configuring the management frame data. That is, the wireless access point apparatus 102 sets values to the respective parameters of the CFP Count 603, CFP Period 604, CFP Max Duration 605, and CFP Dur Remaining 606.

Then, as shown in FIG. 8, the wireless access point apparatus 102 sends a new beacon to the wireless terminals 103 to 106 and the wireless digital video camera 101 in the service area by broadcast during the new transmission frame period 404 shown in FIG. 5 (M1007, M1008, and M1009). The new transmission frame period 404 in FIG. 5 is comprised of the beacon transmission area 701 and the data transmission area 403 (which is comprised of the non-collision area (PCF) 702 and the collision area (DCF) 703).

Thereafter, as shown in FIG. 12, the wireless digital video camera 101 carries out communications with the wireless access point apparatus 102 while exclusively using a wireless medium in the non-collision area (PCF) 702. On the other hand, the wireless terminals 103 to 106 other than the wireless digital video camera 101 carry out random communications in the collision area (DCF) 703 according to a predetermined procedure.

Referring next to FIGS. 10 and 11, a description will be given of a communicating process carried out by the wireless access point apparatus 102.

As shown in FIG. 10, after starting sending a beacon (M1001 and M1002), the wireless access point apparatus 102 waits for the receipt of an authentication request from any of wireless-terminals (including the wireless digital video camera 101) (step S1101). Upon reception of the authentication request from any of the wireless terminals, the wireless access point apparatus 102 starts the authentication sequence process (M1004) between itself and the wireless terminal (step S1102). Upon completion of the authentication sequence process (M1004) with the wireless terminal (step S1103), the wireless access point apparatus 102 starts the association (M1005) with the wireless terminal (step S1104).

Upon completion of the association (M1005) (step S1105), the wireless access point apparatus 102 determines whether or not any of the wireless terminals connected to or accommodated in the wireless access point apparatus 102 requires real-time communication (requires a non-collision area (PCF)) according to function information supplied from the wireless terminal (step S1106). If the wireless terminal is a wireless terminal which requires real-time communications, the wireless access point apparatus 102 then determines whether or not there is any wireless terminal being in communication among the wireless terminals connected to or accommodated in the wireless access point apparatus 102 (step S1107). If there is any wireless terminal being in communication, the wireless access point apparatus 102 waits until the wireless terminal being in communication completes communication. When the wireless terminal being in communication completes communication, or if there is no wireless terminal being in communication among the wireless terminals connected to or accommodated in the wireless access point apparatus 102, the wireless access point apparatus 102 suspends the transmission of the beacon for a predetermined period of time (for example, 10 seconds), and then changes the data transmission area and sends a new beacon (M1007, M1008, and M1009) (step S1108) to terminate the process. If, in the step S1103, the wireless terminal which requested authentication has not been successfully authenticated since its connection to the wireless access point apparatus 102 could not be acknowledged, the process is immediately terminated.

As shown in FIG. 11, upon start of data communication with a wireless terminal (step S1201), the wireless access point apparatus 102 analyzes the transmission frame period 404 being in use (step S1202). Then, the wireless access point apparatus 102 determines whether the non-collision area (PCF) 702 exists or not (step S1203). If the non-collision area (PCF) 702 does not exist, the wireless access point apparatus 102 terminates the process.

On the other hand, if the non-collision area (PCF) 702 exists, the wireless access point apparatus 102 reduces the maximum length of data to be sent, and decreases the size of a data packet which can be sent at a time (step S1204). Here, when data is sent to the wireless digital video camera 101, the maximum length of data to be sent is reduced, and similarly, when data is sent from the wireless terminals 103 to 106, the maximum length of data to be sent is reduced.

In this way, the band area of the non-collision area (PCF) 702 is secured for real-time communication with the wireless digital video camera 101 which carries out communication while exclusively using the wireless medium in the non-collision area (PCF) 702.

As described above, according to the present embodiment, an efficient transmission frame can be configured for a plurality of wireless terminals connected to or accommodated in the wireless access point apparatus 102, and therefore it is possible to flexibly cope with the plurality of wireless terminals having various communications functions.

Figure 13:
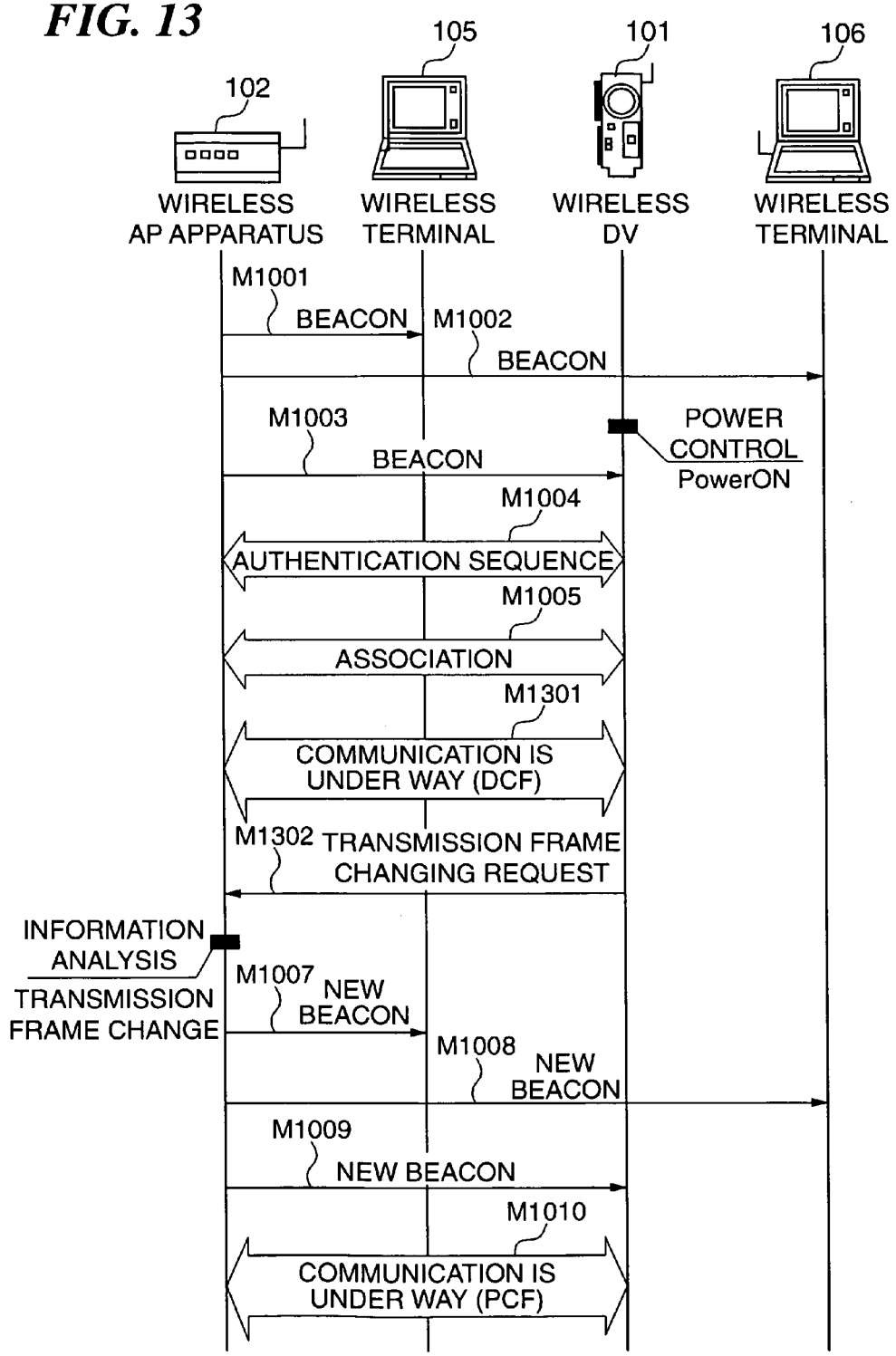
FIG. 13 is a diagram showing a communicating process sequence carried out between a wireless access point apparatus and a wireless terminal in a wireless LAN system according to a second embodiment of the present invention.
Figure 14:
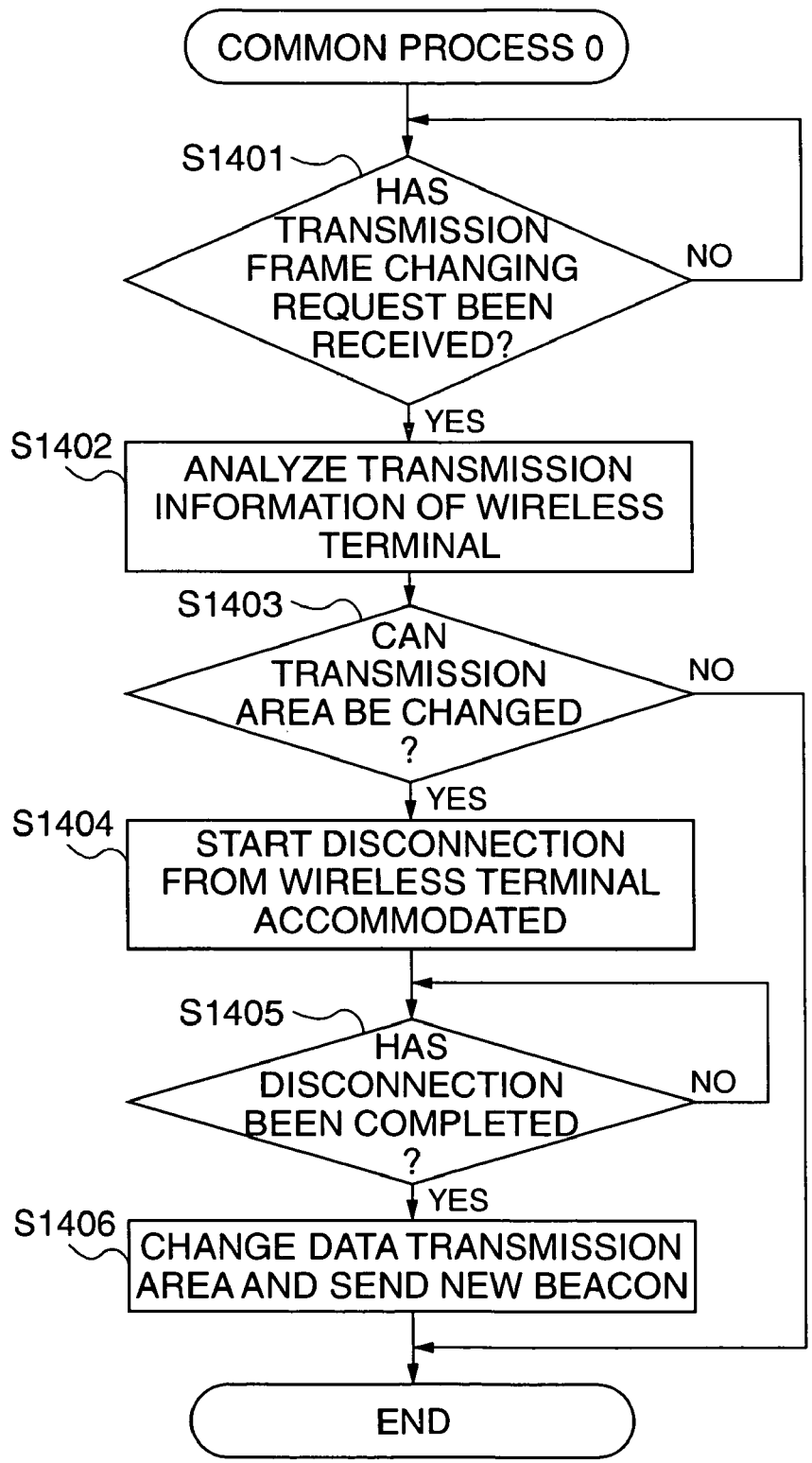
FIG. 14 is a flow chart showing the procedure of a communicating process carried out when the wireless access point apparatus in the wireless LAN system according to the second embodiment is activated.

Referring next to FIGS. 13 and 14, a description will be given of a second embodiment of the present invention. FIG. 13 is a diagram showing a communicating process sequence carried out between a wireless access point apparatus and a wireless terminal in a wireless LAN system according to the second embodiment. FIG. 14 is a flow chart showing the procedure of a communicating process carried out when the wireless access point apparatus in the wireless LAN system according to the second embodiment is activated.

The arrangement of the wireless LAN system according to the present embodiment is identical with that of the wireless LAN system according to the above described first embodiment, and description thereof is therefore omitted. In the following description, apparatuses and procedures corresponding to those of the above described first embodiment are denoted by the same reference numerals.

When the wireless access point apparatus 102 is activated, information relating to the collision area (DCF) 402 is set in an area for setting the DS Parameter Set 302 constituting a part of the beacon frame data 301 in the management frame data format defined by IEEE 802.11, thus configuring the management frame data.

As shown in FIG. 13, the wireless access point apparatus 102 sends a beacon to the wireless terminals 103 to 106 in the service area by broadcast during the transmission frame period 404 comprised of the beacon information transmission area 401 and the data transmission area 403 (M1001 and M1002). In the case where the wireless digital video camera 101 outside the service area of the wireless access point apparatus 102 is moved into the service area, or in the case where the wireless digital video camera 101 is activated in the service area by e.g. turning-on of power supply, the wireless digital video camera 101 as well as the wireless terminals 103 to 106 receive the beacon from the wireless access point apparatus 102 (M1003). Then, the wireless digital video camera 101 carries out an authentication sequence process between itself and the wireless access point apparatus 102 according to access point identifier (ESSID) information so as to request connection to or accommodation into the wireless access point apparatus 102 (M1004).

Upon completion of the authentication sequence process (M1004) between the wireless digital video camera 101 and the wireless access point apparatus 102, the wireless digital video camera 101 carries out association with the wireless access point apparatus 102 (M1005). Upon completion of the association (M1005), random communication between the wireless access point apparatus 102 and the wireless digital video camera 101 is carried out in the collision area (DCF) 402 according to a predetermined procedure (M1301).

Then, the wireless digital video camera 101 issues a transmission frame changing request (M1302). Upon reception of the transmission frame changing request, the wireless access point apparatus 102 analyzes transmission information peculiar to the wireless digital video camera 101 included in the transmission frame changing request, and determines whether or not it is possible to change the transmission area according to the analysis result. If it is possible to change the transmission area, the wireless access point apparatus 102 starts a process for disconnecting a wireless link with the wireless terminals 103 to 106 connected to or accommodated in the wireless access point apparatus 102, and continues the process until the wireless link is completely disconnected. On the other hand, if it is impossible to change the transmission area, the wireless access point apparatus 102 does not carry out the process for disconnecting the wireless link.

When the wireless link with the wireless terminals 103 to 106 connected to or accommodated in the wireless access point apparatus 102 is completely disconnected, the wireless access point apparatus 102 sets values to the respective parameters relating to the non-collision area (PCF) 702 in the setting area of the CF Parameter Set 602 constituting a part of the beacon frame data 601, that is, the wireless access point apparatus 102 sets values to the CFP Count 603, CFP Period 604, CFP Max Duration 605, and CFP Dur Remaining 606 according to transmission information (including setting parameters) peculiar to the wireless digital video camera 101 included in the transmission frame changing request, thus configuring management frame data.

Then, as shown in FIG. 8, the wireless access point apparatus 102 sends a beacon to the wireless terminals 103 to 106 and the wireless digital video camera 101 in the service area by broadcast during the new transmission frame period 404 shown in FIG. 5 (M1007, M1008, and M1009). The new transmission frame period 404 in FIG. 5 is comprised of the beacon transmission area 701 and the data transmission area 403 (comprised of the non-collision area (PCF) 702 and the collision area (DCF) 703).

Thereafter, the wireless digital video camera 101 carries out communication with the wireless access point apparatus 102 while exclusively using the wireless medium in the non-collision area (PCF) 702 (M1010; see FIG. 12), and the wireless terminals 103 to 106 other than the wireless digital video camera 101 carry out random communications in the collision area (DCF) 703 according to a predetermined procedure.

Referring next to FIG. 14, a description will be given of a communicating process carried out by the wireless access point apparatus 102 upon reception of the transmission frame changing request from any of the wireless terminals.

As shown in FIG. 14, upon reception of the transmission frame changing request (M1302) from the wireless terminals (including the wireless digital video camera 101) (step S1401), the wireless access point apparatus 102 analyzes transmission information peculiar to the wireless terminals included in the received transmission frame changing request (step S1402), and determines whether or not it is possible to change the transmission area according to the analysis result (step S1403). If it is possible to change the transmission area, the wireless access point apparatus 102 starts a process for disconnecting a wireless link with the wireless terminals 103 to 106 connected to or accommodated in the wireless access point apparatus 102 (step S1404), and waits until the wireless link is completely disconnected (step S1405). On the other hand, if it is impossible to change the transmission area, the wireless access point apparatus 102 terminates the process without carrying out the process for disconnecting the wireless link.

When the wireless link with the wireless terminals 103 to 106 connected to or accommodated in the wireless access point apparatus 102 is completely disconnected, the wireless access point apparatus 102 sets values to the respective parameters relating to the non-collision area (PCF) 702 in the setting area of the CF Parameter Set 602 constituting a part of the beacon frame data 601, that is, the wireless access point apparatus 102 sets values to the CFP Count 603, CFP Period 604, CFP Max Duration 605, and CFP Dur Remaining 606 according to transmission information (including setting parameters) peculiar to the wireless terminals 103 to 106 included in the transmission frame changing request, thus configuring management frame data. Then, the wireless access point apparatus 102 sends a new beacon to the wireless terminals 103 to 106 and the wireless digital video camera 101 in the service area by broadcast (M1007, M1008, and M1009) (step S1406).

As a result, according to the present embodiment, the same effects as those in the above described first embodiment can be obtained.

Figure 15:
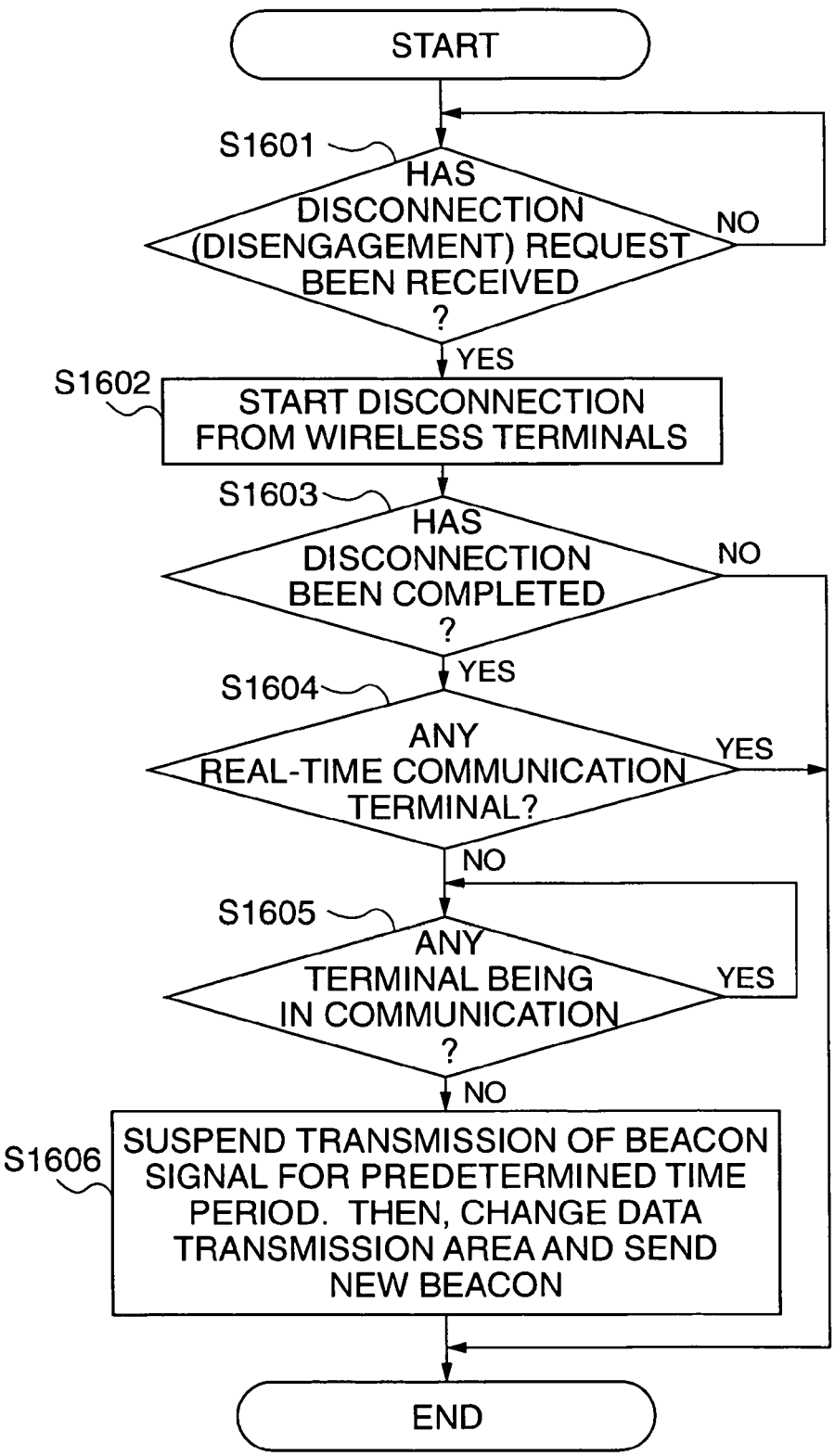
FIG. 15 is a flow chart showing the procedure of a communicating process carried out when the wireless access point apparatus in the wireless LAN system according to a third embodiment of the present invention is activated.
Figure 16:
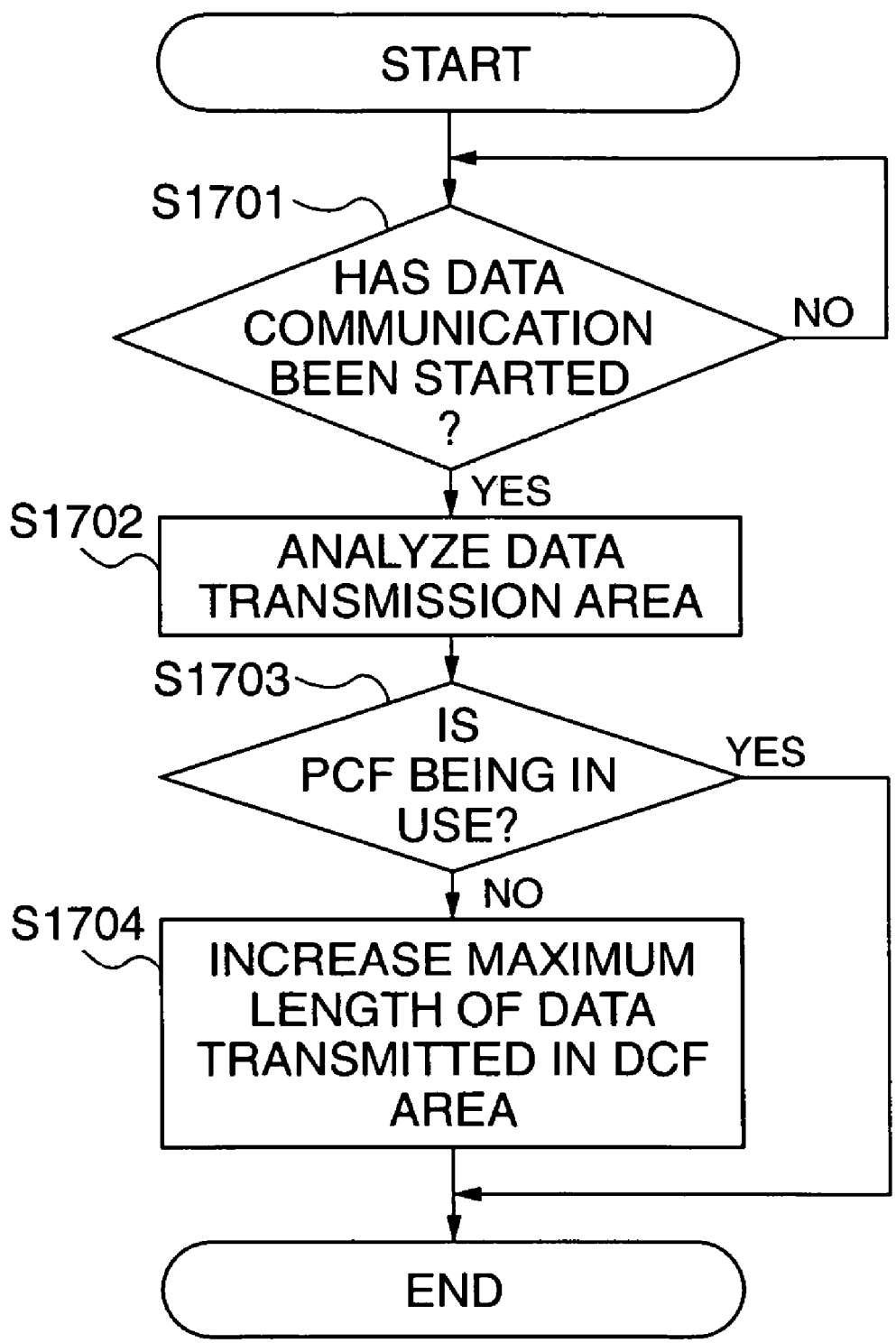
FIG. 16 is a diagram showing the procedure of a communicating process carried out when the wireless access point apparatus in the wireless LAN system according to the third embodiment transmits data.
Figure 17:
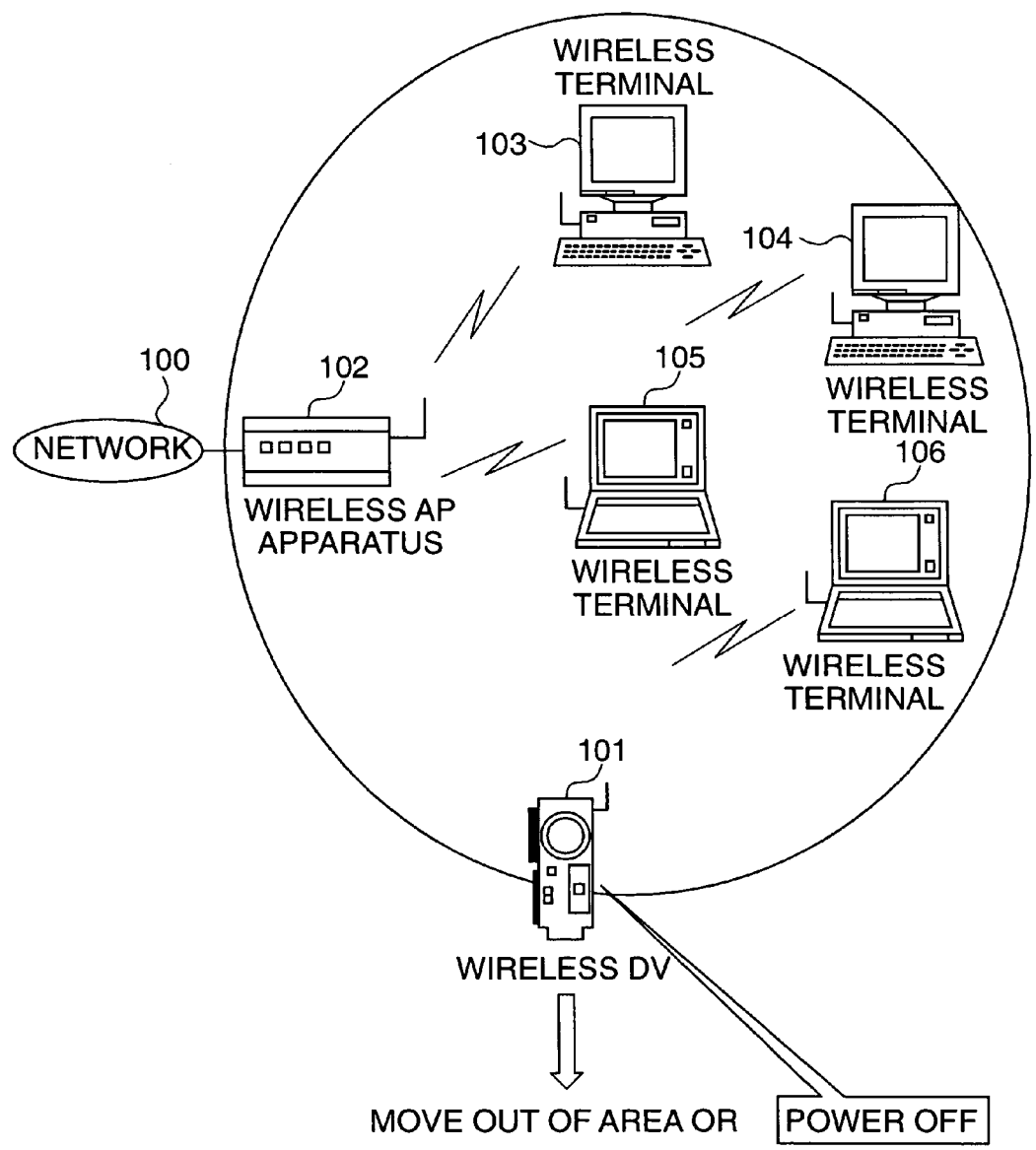
FIG. 17 is a diagram schematically showing a state in which a beacon is transmitted in the case where a wireless digital video camera in the wireless LAN system according to the third embodiment is moved out of a service area of the wireless access point apparatus, or in the case where power supply to the wireless digital video camera is turned off.
Figure 18A:
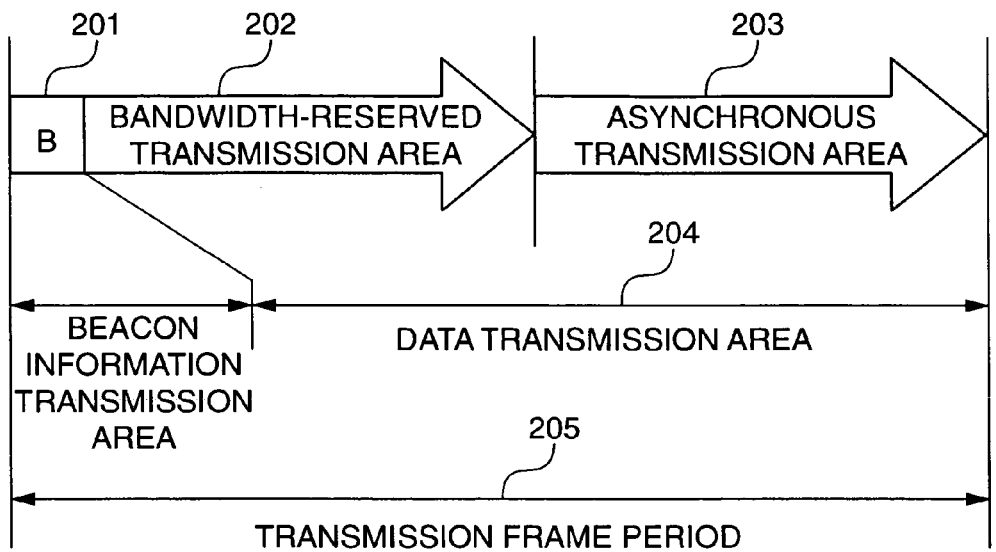
Figure 18B:
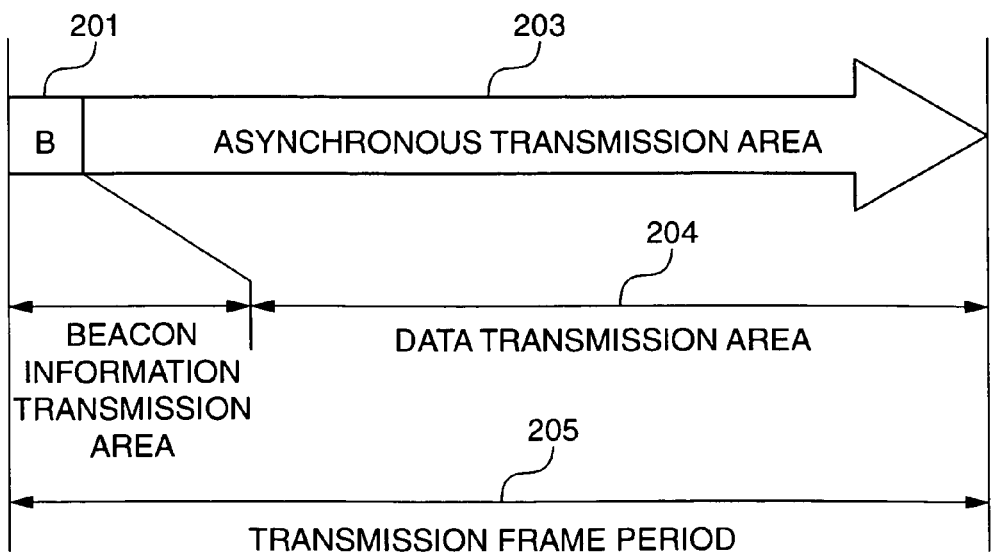

Referring next to FIGS. 15 to 17, a description will be given of a third embodiment of the present invention. FIG. 15 is a flow chart showing the procedure of a communicating process carried out when the wireless access point apparatus in the wireless LAN system according to the third embodiment is activated. FIG. 16 is a diagram showing the procedure of a communicating process carried out when the wireless access point apparatus in the wireless LAN system according to the third embodiment transmits data. FIG. 17 is a diagram schematically showing a state in which a beacon is transmitted in the case where a wireless digital video camera in the wireless LAN system according to the third embodiment is moved out of the service area of the wireless access point apparatus, or in the case where power supply to the wireless digital video camera is turned off.

The arrangement of the wireless LAN system according to the present embodiment is identical with that of the wireless LAN system according to the above described first embodiment, and description thereof is therefore omitted. In the following description, apparatuses and procedures corresponding to those of the above described first embodiment are denoted by the same reference numerals.

As shown in FIG. 17, in the case where the wireless digital video camera 101 is moved out of the service area of the wireless access point apparatus 102, or in the case where power supply to the wireless digital video camera 101 is turned off, the wireless digital video camera 101 sends a disconnecting request to the wireless access point apparatus 102.

As shown in FIG. 15, upon reception of the disconnecting request from a wireless terminal such as the wireless digital video camera 101 (step S1601), the wireless access point apparatus 102 starts a disconnecting process (step S1602), and determines whether the disconnecting process has been completed or not (step S1603). If the disconnecting process has not been completed, the present communicating process is terminated. On the other hand, if the disconnecting process has been completed, the wireless access point apparatus 102 determines whether or not there is any wireless terminal which requires real-time communication (essentially requires a non-collision area (PCF)) (step S1604). If there is any wireless terminal which requires real-time communication, the wireless access point apparatus 102 terminates the communicating process.

On the other hand, when there is no wireless terminal which requires real-time communication, if there is any wireless terminal being in communication among the wireless terminals connected to or accommodated in the wireless access point apparatus 102, the wireless access point apparatus 102 waits until the communication is completed (step S1605). If there is no wireless terminal being in communication, the wireless access point apparatus 102 suspends the transmission of a beacon for a predetermined period of time (for example, 10 seconds), and then changes the data transmission area and sends a new beacon (step S1606) to terminate the communicating process. Here, the wireless access point apparatus 102 sets parameters relating to the collision area (DCF) 402 in the setting area of the DS Parameter Set 302 constituting a part of the beacon frame data 301 in a management frame data format defined by IEEE 802.11, thus configuring management frame data. Then, a beacon is sent by broadcast to the wireless terminals 103 to 106 in the service area during the new transmission frame period 404 comprised of the beacon information transmission area 401 and the data transmission area 403.

Thereafter, the wireless terminals 103 to 106 other than the wireless digital video camera 101 carry out random communications in the collision area (DCF) 402 according to a predetermined procedure.

As shown in FIG. 16, upon start of communication (step S1701), the wireless access point apparatus 102 analyzes a data transmission area being in use (step S1702), and determines whether the non-collision area (PCF) 702 exists or not, according to the result of the analysis (step S1703). If the non-collision area (PCF) 702 does not exist, the wireless access point apparatus 102 increases the maximum length of data to be sent in the DCF area, and enlarges the size of a data packet which can be sent at a time (step S1704) to terminate the present process. Similarly, in the case where the wireless terminals 103 to 106 other than the wireless digital video camera 101 start communications with the wireless access point apparatus 102, the maximum length of data to be sent is also increased, followed by termination of the present process.

On the other hand, if the non-collision area (PCF) 702 exists (step S1203), the present value obtained by decreasing the maximum length of data to be sent is used as a set value for the maximum length of data to be sent, and the present process is terminated without performing operations as to the maximum length of data to be sent.

As a result, according to the present embodiment, the same effects as in the above described first embodiment can be obtained.

It should be noted that in the above described first embodiment, after the association (M1005) between the wireless digital video camera 101 and the wireless access point apparatus 102 is completed, the wireless access point apparatus 102 determines whether to change the data transmission area, depending upon whether or not the wireless digital video camera 101 connected to or accommodated in the wireless access point apparatus 102 is a wireless terminal which requires real-time communication (non-collision area (PCF)). In the above described second embodiment, the wireless access point apparatus 102 determines whether to change the data transmission area according to the result of the analysis of transmission information peculiar to the wireless digital video camera 101, which is included in the transmission frame changing request (M1302). Alternatively, however, it may be configured such that during execution of the association (M1005) in which a wireless terminal is connected to or accommodated in the wireless access point apparatus 102, the transmission information (including CFP setting parameters) peculiar to the wireless digital video camera 101 is sent to the wireless access point apparatus 102, and according to the received transmission information, the wireless access point apparatus 102 sets values to the respective parameters relating to the non-collision area (PCF) 702 in the setting area of the CF Parameter Set 602 constituting a part of the beacon frame data 601 in the management frame data format defined by IEEE 802.11, that is, the wireless access point apparatus 102 sets values to the CFP Count 603, CFP Period 604, CFP Max Duration 605, and CFP Dur Remaining 606.

Further, although in the above described first to third embodiments, the wireless access point apparatus 102 sends information indicating that the data transmission area is to be used as a data transmission frame period, as a part of beacon information by broadcast to a plurality of wireless terminals existing in the service area, this is not limitative, but the present invention can be realized even if the wireless access point apparatus 102 uses multicast or unicast, instead of broadcast, in sending the information indicating that the data transmission area is to be used as a data transmission frame period to the plurality of wireless terminals.

Although in the above described embodiments, the present invention is applied to a wireless LAN system in which data transmission area changing control is provided by the wireless access point apparatus which configures an efficient transmission frame so as to flexibly cope with a plurality of wireless terminals having various communicating functions (PCF/DCF), this is not limitative, but the present invention may be applied to any system irrespective of whether analog signals or digital signals are handled, insofar as one or more client terminals are connected to a network using a wireless transmission channel. Further, it should be understood that various changes in or to the present invention may be possible without departing from the spirits thereof.

As described above, according to the present invention, it is possible to configure an efficient transmission frame for a plurality of wireless communication terminals connected to or accommodated in the wireless access point apparatus, and to flexibly cope with the wireless communication terminals having various communicating functions.

Also, in the case where a wireless communication terminal which carries out real-time data transmission is connected to or accommodated in the wireless access point apparatus which permits the use of only an asynchronous transmission area (DCF), at the time of connecting or accommodating the wireless communication terminal to or in the wireless access point apparatus, or in response to a request from the wireless communication terminal, new beacon information indicating that a data transmission area which permits the use of both the bandwidth-reserved transmission area (PCF) and the asynchronous transmission area (DCF) is to be used as the transmission frame period is sent to wireless communication terminals existing in the service area, so that the bandwidth-reserved transmission area (PCF) can be used, and conflict between the wireless communication terminal and the other plurality of wireless communication terminals can be avoided.

On this occasion, by reducing the maximum length of data sent and received in the MAC layer, the period of the asynchronous transmission area (DCF) can be prevented from being extended and a steady bandwidth-reserved transmission area (PCF) can be secured, thus ensuring real-time data transmission.

Also, in the case where a wireless communication terminal which uses a bandwidth-reserved transmission area (PCF) in the state of permitting the use of both the bandwidth-reserved transmission area (PCF) and the asynchronous transmission area (DCF) is detached from the wireless access point apparatus, new beacon information indicating that a data transmission area which permits the use of only the asynchronous transmission area (DCF) is to be used as the transmission frame period is sent to wireless communication terminals existing in the service area, so that the period of time which is assigned to the asynchronous transmission area (DCF) as the data transmission area is increased, and the bandwidth-reserved transmission area (PCF) which is not used does not use a part of the wireless transmission frame structure. As a result, the throughput can be enhanced.

On this occasion, by increasing the maximum length of data sent and received in the asynchronous transmission area (DCF) in the MAC layer, the throughput can be further enhanced.

It is to be understood that the object of the present invention may also be accomplished by supplying a system or an apparatus with a storage medium in which a program code of software, which realizes the functions of any of the above described embodiments is stored, and causing a computer (or a CPU or a MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be supplied by downloading via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2004-047799 Feb. 24, 2004, which is hereby incorporated by reference herein.

What is claimed is:

1. A wireless access point apparatus comprising:
   a connection device that performs a connection processing in which a wireless communicating apparatus is connected to the wireless access point apparatus;
   a first determining device that determines whether the wireless communicating apparatus connected to the wireless access point is a type of wireless apparatus that carries out real time communication requiring a non-collision area;
   a second determining device that determines whether the type of wireless communicating apparatus that carries out real time communication has been detached from the wireless access point apparatus;
   a changing device that changes a currently used data transmission area comprised of only a collision area where random access communication is carried out, to a new data transmission area comprised of a non-collision area capable of exclusively using a wireless medium and a collision area where random access communication is carried out, when said first determining device determines that the wireless communicating apparatus connected to the wireless access point is a type of wireless apparatus that carries out real time communication, and changes the data transmission area comprised of the non-collision area capable of exclusively using the wireless medium and the collision area where the random access communication is carried out, to the data transmission area comprised of only the collision area where the random access communication is carried out, when said second determining device determines that the type of wireless communicating apparatus that carries out real time communication has been detached from the wireless access point apparatus; and
   a sending device that sends information indicative of the data transmission area changed by said changing device to the wireless communicating apparatus connected by said connection device.

2. A wireless access point apparatus according to claim 1, wherein said sending device sends information indicative of the new data transmission area changed by said changing device to a plurality of wireless communicating apparatuses existing in an area of the wireless access point apparatus.

3. A wireless access point apparatus according to claim 1, wherein said sending device sends information indicative of the new data transmission area changed by said changing device, by broadcast using beacon information.

4. A wireless access point apparatus according to claim 1, wherein said sending device sends the information indicative of the new data transmission area changed by said changing device, by unicast to a plurality of wireless communicating apparatuses existing in an area of the wireless access point apparatus.

5. A wireless access point apparatus according to claim 1, wherein said changing device changes the currently used data transmission area to the new data transmission area by assigning a part of the collision area of the currently used data transmission area to the non-collision area of the new data transmission area.

6. A wireless access point apparatus according to claim 1, wherein said changing device determines whether there is no wireless communicating apparatus being in communication, and changes the currently used data transmission area when it is determined by said changing device that there is no wireless communicating apparatus being in communication.

7. A wireless access point apparatus according to claim 1, wherein said sending device suspends transmission of information indicative of the currently used data transmission area for a predetermined period of time before said sending device sends the information indicative of the new data transmission area.

8. A wireless access point apparatus according to claim 1, wherein said changing device changes the currently used data transmission area after link with the wireless communicating apparatus connected by said connection device is disconnected.

9. A wireless access point apparatus according to claim 1, further comprising a data length changing device that changes the maximum length of data to be sent in the collision area when said changing device changes the data transmission area.

10. A wireless LAN system comprising:
- a wireless access point apparatus being capable of setting a data transmission area including a non-collision area capable of exclusively using a wireless medium, and a collision area where random access communication is carried out;
- wherein said wireless access point apparatus comprises:
- a connection device that performs a connection processing in which a wireless communicating apparatus is connected to the wireless access point apparatus;
- a first determining device that determines whether the wireless communicating apparatus connected to the wireless access point is a type of wireless apparatus that carries out real time communication requiring a non-collision area;
- a second determining device that determines whether the type of wireless communicating apparatus that carries carrying out real time communication has been detached from the wireless access point apparatus;
- a changing device that changes a currently used data transmission area comprised of only a collision area where random access communication is carried out, to a new data transmission area comprised of a non-collision area capable of exclusively using a wireless medium and a collision area where random access communication is carried out, when said first determining device determines that the wireless communicating apparatus connected to the wireless access point is a type of wireless apparatus that carries out real time communication, and changes the data transmission area comprised of the non-collision area capable of exclusively using the wireless medium and the collision area where the random access communication is carried out, to the data transmission area comprised of only the collision area where the random access communication is carried out, when said second determining device determines that the type of wireless communicating apparatus that carries out real time communication has been detached from the wireless access point apparatus; and
- a sending device that sends information indicative of the data transmission area changed by said changing device to the wireless communicating apparatus connected by said connection device.

11. A storage medium storing a computer-readable program non-transient for implementing a wireless communicating method of a wireless access point apparatus, the program comprising:
- a connection module for performing a connection processing in which a wireless communicating apparatus is connected to the wireless access point apparatus;
- a determining module for determining whether the wireless communicating apparatus connected to the wireless access point is a type of wireless apparatus that carries carrying out real time communication using a non-collision area;
- a second determining module for determining whether the type of wireless communicating apparatus that carries out real time communication has been detached from the wireless access point apparatus;
- a changing module for changing a currently used data transmission area comprised of only a collision area where random access communication is carried out, to a new data transmission area comprised of a non-collision area capable of exclusively using a wireless medium and a collision area where random access communication is carried out, when it is determined by said determining module that the wireless communicating apparatus connected to the wireless access point is a type of wireless apparatus that carries out real time communication, and changing the data transmission area comprised of the non-collision area capable of exclusively using the wireless medium and the collision area where the random access communication is carried out, to the data transmission area comprised of only the collision area where the random access communication is carried out, when said second determining module determines that the type of wireless communicating apparatus that carries out real time communication has been detached from the wireless access point apparatus; and
- a sending module for sending information indicative of the data transmission area changed by said changing module to the wireless communicating apparatus connected by said connection/accommodation module.

* * * * *